United States Patent Office 3,268,687
Patented August 23, 1966

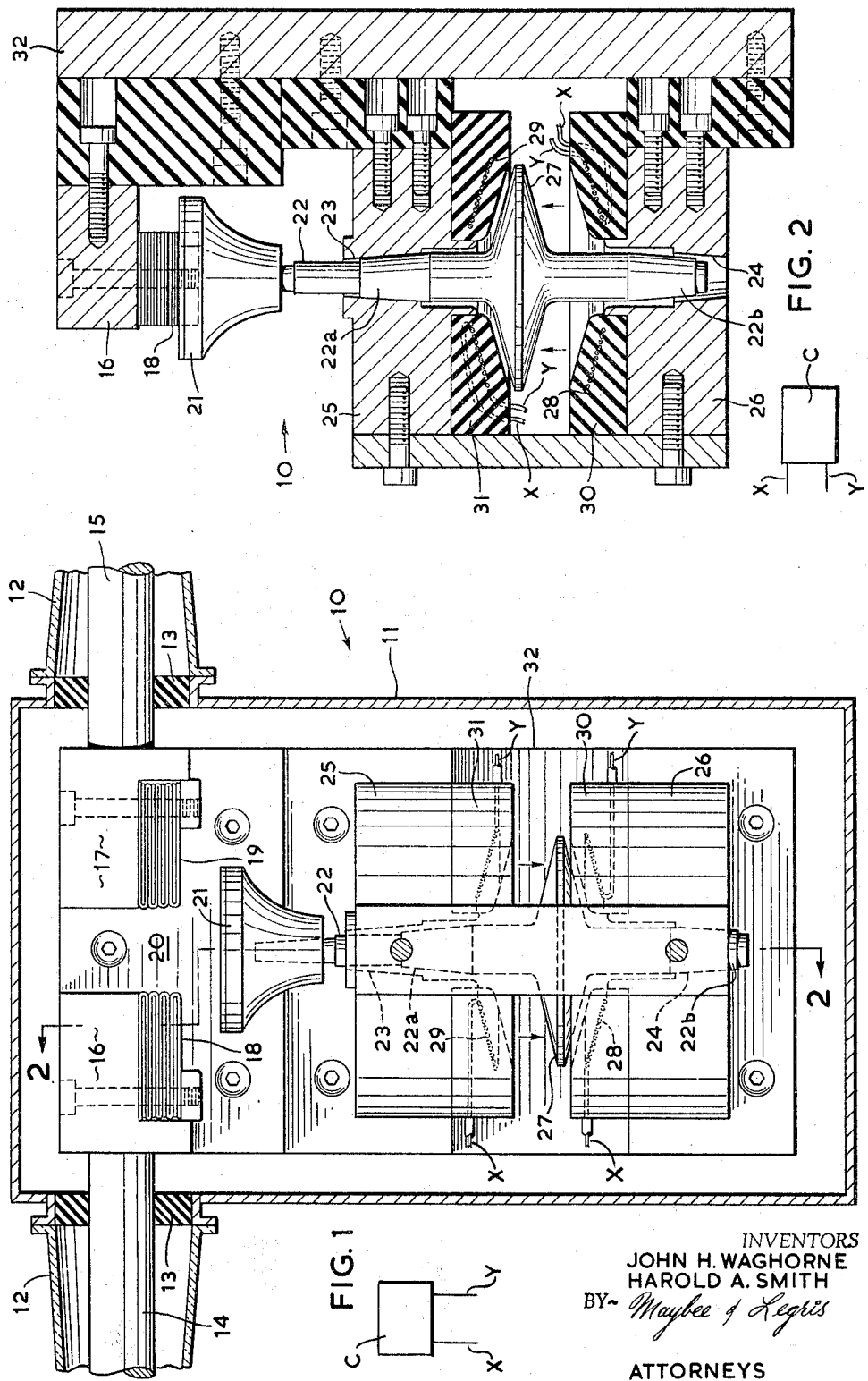

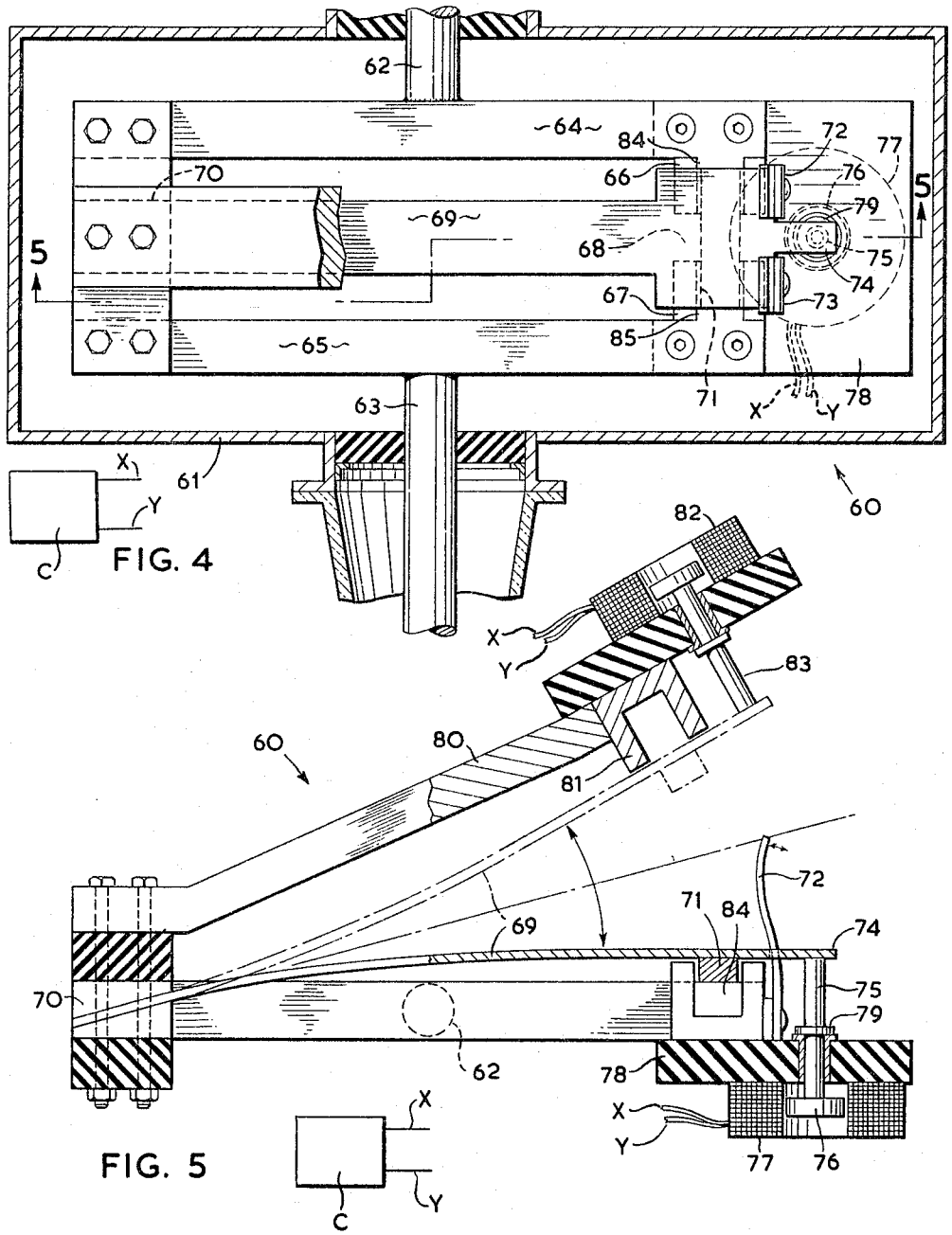

3,268,687
HIGH SPEED DEVICE FOR INTERRUPTING AND COMPLETING HIGH VOLTAGE POWER CIRCUITS
John Henry Waghorne, 5 Mountain Ash Court, Etobicoke, Ontario, Canada, and Harold Armstrong Smith, 1463 Larchview Trail, Port Credit, Ontario, Canada
Filed May 18, 1964, Ser. No. 368,255
Claims priority, application Great Britain, May 20, 1963, 19,951/63
9 Claims. (Cl. 335—71)

This invention relates to a switch for an electric power circuit and in particular to an improved device for interrupting and completing a high voltage electric power circuit.

A circuit breaker is a device for interrupting an electric power circuit between separable contacts during normal and abnormal conditions. Under normal conditions, circuit breakers are used to control the flow of energy in a power system; for example, they may be used to open a transmission line or to remove a generator or a transformer bank from the system. Under abnormal conditions, such as short-circuit or over-load conditions, circuit breakers are used to isolate the portion of the circuit in which the abnormal condition has occurred.

In recent years, the demand for electrical power has steadily increased, and circuit breakers are now often required to switch large amounts of electrical power at voltages in excess of 100 kilovolts. The design of circuit breakers for this range of voltages entails special engineering problems; for example, a major problem is the control of the arc which forms between the contacts of a circuit breaker when the contacts are separated in a dielectric. As the contacts begin to separate, they are at first relatively close together, and if the voltage across the separated contacts exceeds the dielectric strength of the dielectric material between the contacts, the dielectric material breaks down and forms a highly conductive ionized arc-path for current to flow. The arc thus formed may continue to exist even when the contacts have reached their maximum predetermined separation. When the current flowing through the breaker passes through a current zero, the arc will become extinguished and the circuit will be interrupted if the arc-path becomes sufficiently de-ionized and regains sufficient dielectric strength quickly enough in order to resist the subsequent growth of recovery voltage. Thus, as the voltage between the separated contacts begins to rise after a current zero, the dielectric strength of the arc-path must continue to rise at a faster rate and be greater than the rising voltage between the contacts, in order to maintain arc extinction. If the dielectric material does not achieve sufficient dielectric strength quickly enough, the arc may re-strike and thus cause undesirable conduction between the contacts of the circuit breaker. Up to the present, the design of high voltage circuit breakers has been largely concerned with establishing, controlling and extinguishing this arc.

Various dielectric media have been used to initially sustain the arc and then to extinguish it. Mineral oil is commonly used as a dielectric, and when the contacts of a circuit breaker separate under oil, the oil between the contacts breaks down and the resultant arc plays in a high pressure gas bubble, formed by the decomposing oil. Arrangements have been devised to use the gaseous pressure produced by the arc to force cool oil through the arc in order to extinguish it. In other types of circuit breakers, blasts of compressed air are introduced into the circuit breaker as the contacts separate. More recently, sulphur hexafluoride gas under pressure and also vacuum have been used as dielectric media.

At high voltages, such circuit breakers are expensive and rather unwieldy in size for they must be able not only to continuously carry the rated load current and to interrupt the circuit under abnormal conditions but they must also be able to withstand pressures produced by the internal arc. The expense and bulkiness of a high voltage circuit breaker could be reduced if the contacts could be caused to begin to separate, not at a random point on the current wave (as in present circuit breakers) but at the instant of a current zero, and the rate of separation made to proceed rapidly enough so that no arc-path and consequently no conduction occurs between the separated contacts. If this could be done, not initial arc and no re-strike would occur, thus eliminating a major engineering problem in the design of high voltage circuit breakers.

In order to achieve this goal, however, the separable contacts in the circuit breaker must be moved apart with great velocity and high acceleration. Vacuum is an excellent dielectric for this purpose, but even in a vacuum, velocities of the order of 100 to 200 ft./sec. and accelerations of the order of 10,000 to 40,000 g seem indicated; no present breaker mechanism appears to be able to withstand such forces. In known circuit breakers a speed of 20 ft./sec. is considered very fast, because of the relatively high inertia of the parts that must be moved.

According to the invention, it is now proposed to provide a circuit breaker in which the breaker contacts are arranged to open or to close in a vacuum at or shortly before a time of least circuit disturbance, and which the velocity of the contacts is sufficiently great that initial arcing is mitigated and in the case of circuit interruption, arc re-striking is prevented. When interrupting a circuit the time of least circuit disturbance is a current zero; when completing a circuit, the time of least circuit disturbance is usually a voltage zero. In some reactive circuits it may be desirable to complete the circuit at a time other than a voltage zero but in general the time of least circuit disturbance when completing the circuit is approximately a voltage zero. In addition to a saving of expense and of bulkiness, the circuit breaker of this invention permits more rapid clearing of faults than can be achieved by conventional circuit breakers, thereby improving the transient stability and increasing the load carrying capacity of the circuit. The circuit breaker of this invention reduces the danger of large overvoltages and flashovers due to interruption of small lagging currents at times other than a current zero, because all currents flowing through this circuit breaker are interrupted at or about a current zero. Moreover, re-strikes due to interruption of capacitive circuits at a current zero are prevented in this circuit breaker because the vacuum dielectric recovers its dielectric strength in a few microseconds and will withstand any capacitive recovery voltages likely to be encountered. By completing a circuit at a time of least circuit disturbance, transient switching overvoltages are mitigated, thereby reducing the level of insulation required in the circuit.

Objects of this invention are therefore to provide a device for making and breaking power circuit that is relatively small and simple and is capable of opening and closing high voltage electric power circuits.

The invention is illustrated by way of example in the accompaying drawings in which:

FIGURE 1 is a plan view partly in section of one form of a circuit breaker of the invention, the circuit breaker being shown in its open circuit position;

FIGURE 2 is a sectional view of the circuit breaker of FIGURE 1, taken along the line 2—2 and shown in its closed circuit position and with its housing removed;

FIGURE 4 is a plan view partly in section and partly broken away of another form of a circuit breaker, and FIGURE 5 is a sectional view of the circuit breaker of FIGURE 4, taken along the line 5—5 and with its housing removed.

Figure 3:
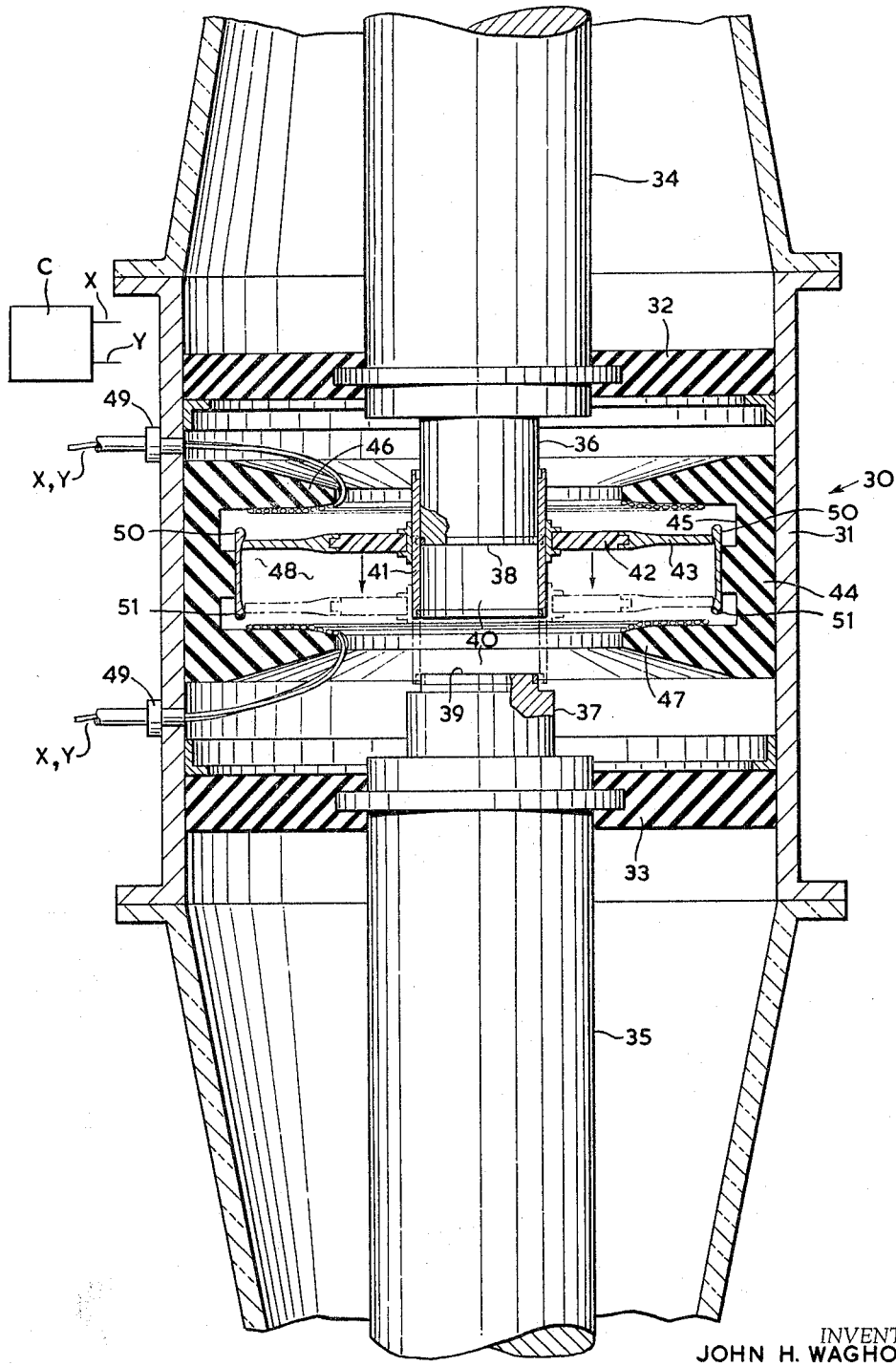
FIGURE 3 is a plan view partly in section of another form of a circuit breaker.

Referring now to FIGURES 1 and 2, a circuit breaker generally indicated at 10 has an evacuated T-shaped housing 11 consisting of a hollow metal cylinder closed at its ends, and having long tapered cones 12 of dielectric material extending from opposite sides of the cylinder. Two fixed line conductors 14 and 15 extend into the housing through the tapered cones 12 and are supported by solid dielectric material 13. The line conductors 14 and 15 have enlarged end portions 16 and 17 that are separated from each other by a gap 20, and the conductor end portions 16 and 17 have resilient conductive pads 18 and 19 constituting contact surfaces. The pads 18 and 19 can be of copper braid that is folded over upon itself.

A movable conductor 21 is secured to the inner end of a shaft 22 which is slidably received in tapered openings 23 and 24 of an inner support member 25 and an outer support member 26, respectively. The shaft has two tapered portions 22a and 22b corresponding to the tapered openings 23 and 24; in the open circuit position of the circuit breaker the tapered portion 22b is wedged tightly into the tapered opening 24 and in the closed circuit position the tapered portion 22a is wedged tightly into the tapered opening 23.

Extending normally from the shaft 22 at about its midpoint is a disc 27 of electrically conductive material such as aluminum, the disc being in the space between the inner and the outer support members 25 and 26. A motor is provided for opening and closing the circuit and it consists of a closing motor conductor or coil 28 and an opening motor coil 29 imbedded in solid dielectric blocks 30 and 31 secured to the inner and outer support members 25 and 26, respectively. Leads from the coils 28 and 29 can be brought out of the housing through conventional insulated vacuum sealing bushings (not shown).

The inner and outer support members 25 and 26 and the dielectric blocks 30 and 31 are supported by a plate 32 which is secured to the housing 11 by any conventional means.

When the movable conductor 21 is in the closed circuit position it bridges the gap between the line conductors 14 and 15, and the disc 27 is adjacent to the opening motor coil 29. If a large current is discharged quickly into the opening motor coil a current of opposite phase is induced into the disc 27 and the disc 27 thereby is accelerated away from the opening motor coil. The conductor 21, being mechanically coupled to the disc 27, is therefore accelerated in the same direction as the disc 27 and it breaks contact with the conductive pads 18 and 19 thus interrupting the circuit. The conductor 21 continues to move away from the conductive pads 18 and 19 until the tapered portion 22b of the shaft engages the tapered opening 24; kinetic energy of the shaft is thereby expended in friction and the shaft comes to rest (without rebounding) in the open circuit position.

The accelerating force which propels the movable conductor 21 toward the open circuit position must be great enough to impart to the conductor 21 at least a critical velocity as defined below. The current for producing this force may be obtained by discharging a previously charged capacitor through the opening motor coil; a capacitor having approximately 30 mfd. capacity charged to a potential of 10,000 volts can supply the necessary force. As indicated above, it is desirable to interrupt the circuit only a few microseconds prior to a current zero, and it has been found that the accelerating discharge current must be initiated (and the motor thereby activated) between about 50–75 microseconds before the current zero to allow time for the current to rise to a level sufficient to cause the shaft and associated structure to begin to move. At the instant of circuit interruption, the current flowing through the line conductors is at or near a zero value, but voltage immediately begins to rise to the full line voltage or beyond. The movable conductor 21 must travel quickly enough to prevent restriking of the arc between it and the conductive pads 18 and 19 which it has just left; this is what is meant by the expression "critical velocity," referred to above. For example, if the recovery voltage wave is rising at a rate of 2,000 volts per microsecond, and if the dielectric strength of the vacuum within the housing is 1,000,000 volts per inch, the movable conductor 21 must move with a velocity of at least 2,000 inches per second or 167 feet per second.

In practice it may not be possible to ensure that the circuit is interrupted at the precise instant of a current zero. Nevertheless the circuit breaker will operate satisfactorily provided the circuit is interrupted shortly before a current zero. An arc of relatively low current may be formed if the circuit is interrupted a few microseconds before the current zero, but this arc will be extinguished quickly as the current passes through the current zero.

When the movable conductor 21 has thus been propelled to the open circuit position, the disc 27 is adjacent to the closing motor winding, and to return the movable conductor to the closed circuit position it is merely necessary to discharge current into the closing motor winding. The movable contact is thus forced to travel back to where it contacts the conductive pads 18 and 19. This operation can likewise be timed so that the circuit is completed at or a few microseconds prior to a time of least circuit disturbance such as a voltage zero.

The circuit breaker is small enough to be conveniently placed inside a cable, and to do this the housing 11 can be secured to a solid insulated cable by means of the long tapered glass cones 12. The outer sheath of the cable (not shown) and the metal housing 11 provide a continuous metallic sheath for the circuit breaker. To connect the circuit breaker to an open line or to a bus the glass cones 12 can be provided with porcelain bushings. Peep holes (not shown) may be provided in housing 11 to allow visual inspection of the mechanism.

The housing should be evacuated to a pressure of about $10^{-4}$ mm. Hg or less.

The circuit breaker illustrated in FIGURE 3 has an evacuated housing generally indicated at 30, consisting of a hollow metal cylinder 31 closed at its ends by long tapered cones of glass or like dielectric material. Two fixed line conductors 34 and 35 extend outwardly from the ends of the housing and are supported in the cylindrical section by discs 32 and 33 of dielectric material; the line conductors have reduced cylindrical end portions 36 and 37, respectively, extending inwardly into the housing. The end portions of both conductors are coaxial, and their opposed faces 38 and 39 are separated by a relatively wide gap 40. An aluminum sleeve 41 of a length greater than the length of the gap, is slidable along the end portions 36 and 37 of the conductors and, at one position (the closed circuit position) it bridges the gap between the conductors and thus provides a current path between them. The sleeve 41 can slide to a second position (the open circuit position) where it contacts one conductor only and is separated from the other conductor, so that current cannot flow between the line conductors. The sleeve 41 is shown in full lines in the open circuit position, and in chain-dotted lines in the closed circuit position.

An annular disc 42 of polytetrafluoroethylene (marketed under the trademark Teflon by E. I. du Pont de Nemours and Co., Inc.) or glass fibre reinforced plastic or like dielectric is secured to the outer surface of the sleeve 41 and extends normally therefrom, and an annular aluminum disc 43 coplanar with disc 42 encompasses the outer periphery of disc 42. Disc 43 serves as a single shorted turn coil and it is insulated from the line conductors 34 and 35 by disc 42. Secured to the inner surface of the cylinder 31 which constitutes part of the housing 30 is a relatively thick porcelain ring 44 which is of channel cross-section; it includes a circumferential web 45 and two circumferential flanges 46 and 47, the web and flanges together defining a cavity 48. The end portions 36 and 37 of the line conductors extend into the central opening of the ring 44. The movable sleeve 41 and the discs 42 and 43 are located within the cavity 48. A closing motor coil, consisting of several turns of insulated copper wire, is secured to the circumferential flange 46, and an opening motor coil, also consisting of several turns of insulated copper wire, is secured to the opposite circumferential flange 47. One lead of each winding is grounded to the housing and the other lead of each winding is brought out of the housing through sealed apertures 49.

When the movable sleeve is in the closed circuit position, where it contacts both line conductors, the aluminum disc 43 is adjacent the opening motor coil. If a large current is discharged quickly into the opening motor coil, a current of opposite phase is induced into the aluminum disc, and the aluminum disc 43 is accelerated rapidly towards the circumferential flange 46. Sleeve 41, being mechanically coupled to disc 43, is therefore accelerated in the same direction, and after travelling a relatively short distance along the end portion 37 of line conductor 35, breaks contact with that conductor and then travels along the end portion 36 of line conductor 34 only.

When the movable sleeve has thus been propelled to the open circuit position, the aluminum disc is adjacent to the closing motor coil, and to return the movable sleeve to the closed circuit position it is merely necessary to discharge current into the closing motor coil. The movable sleeve is thus forced to travel along end portion 36 of line conductor 34, across the gap 40 between the line conductors, and thence along end portion 37 of line conductor 35 to the closed circuit position where it contacts both line conductors. This operation can likewise be timed so that the circuit is completed at or a few microseconds prior to a time of least circuit disturbance, such as a voltage zero.

Means should be provided for decelerating the moving conductor and for assuring its proper posittioning at the ends of the travel. These means can be mass brakes 50 and 51, which can be weighted cantilevered springs that are adapted to contact a portion of the outer edge of the disc 43 after it has travelled a short distance. After contacting a mass brake the disc 43 must displace the mass brake normally to its travel, and in so doing it expends kinetic energy and thereby loses velocity.

The circuit breaker illustrated in FIGURES 4 and 5 differs from the above-described circuit breakers in that the restoring force of a spring is used to produce the required accelerations. Referring now to FIGURES 4 and 5, the circuit breaker indicated generally at 60 has an evacuated housing 61 into which extend two fixed line conductors 62 and 63. Elongated end portions 64 and 65 of the fixed line conductors are in electrical contact at one end with contacts 84 and 85, respectively, which are separated from each other by a gap 68. U-shaped magnets 66 and 67 are secured to and are in electrical contact with the end portions 64 and 65 and the contacts 84 and 85 are within the respective bight portions of the magnets 66 and 67. A flat cantilevered spring 69 is secured at one end to a dielectric block 70 and the spring 69 has contactor 71 which bridges the gap 68 between the contacts 84 and 85 when the spring is retained by the magnets 66 and 67 (closed circuit position). The magnetic force of the magnet is somewhat greater than the restoring force of the spring.

Two S-shaped flat cantilevered springs 72 and 73 are secured at one end to the magnets 66 and 67, respectively, and are in electrical contact therewith. A slender tab 74 of the spring 69 extends between the springs 72 and 73. Means is provided for actuating the spring, and it consists of a light insulating tube 75 having at one end a metallic disc 76 that is within a solenoid 77 secured to a dielectric block 78. A collar 79 is provided on the tube 75 to limit its travel into the solenoid.

An upwardly extending support member 80 has at one end a U-shaped magnet 81, a solenoid 82 and tube 83 that is similar to the structure just described. When the spring 69 is in the position shown in chain-dotted lines (open circuit position) the spring is retained by the magnet 81.

To interrupt the circuit (assuming the spring 69 is in the closed circuit position) current is discharged quickly into the solenoid 77 thereby causing the tube 75 to actuate the tab 74. The spring 69 thereupon accelerates towards its neutral position (shown as a chain-dotted line) where it reaches a maximum velocity. Until the spring reaches the neutral position the circuit is still completed because the spring 69 remains in contact with the springs 72 and 73. The spring 69 continues its excursion motivated by its own stored energy until it approaches sufficiently close to the magnet 81 to be held by the magnet 81.

Current is supplied to the solenoid at a predetermined interval prior to a current zero so that the spring reaches its neutral position and the circuit is interrupted at or a few microseconds prior to the current zero.

To return the spring from the open circuit position to the closed circuit position current is supplied to the solenoid 82 at a predetermined time prior to a voltage zero so that the spring 69 contacts the springs 72 and 73 and thereby closes the circuit at or a few microseconds prior to a time of least circuit disturbance, such as a voltage zero.

The energy supplied to the spring 69 by the solenoid 77 during the opening cycle and by the solenoid 82 during the closing cycle is sufficient to overcome energy losses in the spring and associated structure due to friction, thereby ensuring that the spring 69 will approach the magnets 66 and 67 or 81 sufficiently close to allow the magnets to retain the spring in a fully deflected position.

In order to be able to achieve the required accelerations the spring 69 must have a natural period that is very much less than the period of the current wave in the circuit to be interrupted. The springs 72 and 73 have natural periods less than that of the spring 69.

*Timing*

For reasons stated above the pulse of current used to activate the motors of the above circuit breakers is initiated at a predetermined time prior to a current zero so that at the instant of circuit interruption the current wave is at the current zero or a few microseconds earlier. This timing can be accomplished by a control (indicated by the letter "C" in FIGS. 1–5) capable of subtracting a fraction of the differential of the main current flowing in the circuit from the main current itself and then producing a signal pulse as this difference value passes through zero. Thus, if $I$=amplitude of line current;
$t$=time
$a$=instantaneous line current at time ($t=b$); and
$k$=an arbitrary constant then $$\frac{dI}{dt} = \frac{-a}{b}$$

at $t=-b$
$I=a$ and $$a-(-k)\frac{dI}{dt}=0$$

when $$k\frac{a}{b}=a \text{ or } k=b$$

showing that "b," the prediction time is equal to k, an arbitrary constant. It should be noted that this method does not assume that the main current wave is sinusoidal. It does assume that the slope of "I" remains substantially constant during the interval "b." This method may be accomplished by use of known electric circuits to produce a timing pulse that occurs at a time $t=b$ prior to a current zero. The timing signal pulse may be amplified and used for controlling a normally open triggered gap that links a charged capacitor to the opening motor coil. The timing pulse causes the gap to short-circuit, thereby providing a path for energy stored within the condenser to activate the circuit breaker.

Another method for producing a timing pulse consists of obtaining from a current transformer an undistorted replica of the current to be interrupted, and mixing this current with a highly distorted replica of the current to be interrupted, as can be obtained from a highly saturated current transformer. These currents are multiplied together in a multiplying circuit to produce the desired timing pulses.

What we claim is:

1. A device for interrupting a power circuit comprising an evacuated housing, a pair of fixed line conductors having opposed end portions extending into the housing, the fixed line conductors being electrically insulated from each other and the end portions being separated by a gap, a conductor movable from a closed circuit position where it bridges the gap and electrically interconnects the fixed conductors, to an open circuit position, a shaft connected to the movable conductor and movable towards and away from the fixed line conductors, a first motor conductor which is secured to the shaft, and a second motor conductor which is fixed, the motor conductors being adjacent to each other in the closed circuit position, and means for discharging an electric current into the second motor conductor at a predetermined time prior to a current zero whereby the first motor conductor is repelled and the movable conductor is moved from the closed circuit position to the open circuit position with a velocity sufficient to prevent arc re-striking after the current zero and whereby the circuit is interrupted at or shortly before the current zero.

2. A device as claimed in claim 1 wherein the predetermined time is as short as between about 50 to 75 microseconds prior to a current zero.

3. A device as claimed in claim 1 wherein the housing is evacuated to a pressure of about $10^{-4}$ mm. Hg or less.

4. A device as claimed in claim 1 wherein there is an inner support member and an outer support member spaced from the inner support member, the support members having aligned openings for slidably receiving the shaft, wherein the first motor conductor is an annular disc that is in said space and wherein the second motor conductor is a coil that is secured to the inner support member.

5. A device as claimed in claim 4 wherein the shaft is tapered at its outer end and the opening of the outer support member has a corresponding taper whereby the shaft is wedged into said opening as it approaches the open position so that kinetic energy of the shaft is expended in friction and the shaft comes to rest at the open position.

6. A device as claimed in claim 4 wherein resilient conductive pads are provided on surfaces of the fixed line conductors that are in contact with the movable conductor when it is in the closed circuit position.

7. A device as claimed in claim 5 wherein there is a third motor conductor secured to the outer support member, the third motor conductor being adjacent to the first motor conductor when the shaft is in the open circuit position, and wherein there is means for discharging electric current into the third motor conductor at the said predetermined time whereby the first motor conductor is repelled and the movable conductor is moved from the open circuit position to the closed circuit position.

8. A device as claimed in claim 7 wherein the inner end of the shaft is tapered and the opening of the inner support member correspondingly is tapered, whereby the shaft is wedged into said opening as it approaches the closed circuit position so that kinetic energy of the shaft is expended in friction and the shaft comes to rest at the closed circuit position.

9. A device for interrupting a power circuit comprising an evacuated housing, a pair of fixed line conductors having opposed end portions extending into the housing, the fixed line conductors being electrically insulated from each other and the end portions being separated by a gap, a conductor comprising a sleeve movable from a closed circuit position where it bridges the gap and electrically interconnects the fixed conductors, to an open circuit position, a first motor conductor comprising a conductive annular disc which is connected to the movable conductor and a second motor conductor which is fixed, the motor conductors being adjacent to each other in the closed circuit position, and means for discharging an electric current into the second motor conductor at a predetermined time prior to a current zero whereby the first motor conductor is repelled and the movable conductor is moved from the closed circuit position to the open circuit position with a velocity sufficient to prevent arc re-striking after the current zero and whereby the circuit is interrupted at or shortly before the current zero.

References Cited by the Examiner

UNITED STATES PATENTS 3,172,010  3/1965  Diebold _____ 317—11

BERNARD A. GILHEANY, *Primary Examiner.*

R. N. ENVALL, Jr., *Assistant Examiner.*